(12) United States Patent
Juzswik et al.

(10) Patent No.: US 6,612,165 B2
(45) Date of Patent: Sep. 2, 2003

(54) TIRE PRESSURE MONITORING SYSTEM WITH PRESSURE GAUGE OPERATING MODE FOR INDICATING WHEN AIR PRESSURE WITHIN A TIRE IS WITHIN A PREDETERMINED PRESSURE RANGE

(75) Inventors: David Leonard Juzswik, Commerce, MI (US); Daniel J. Wyman, Canton, MI (US); Thomas John LeMense, Farmington, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/067,067

(22) Filed: Feb. 4, 2002

(65) Prior Publication Data

US 2003/0145650 A1 Aug. 7, 2003

(51) Int. Cl.$^7$ .............................................. B60C 23/02
(52) U.S. Cl. .................... 73/146.5; 73/146.2; 73/146.3; 73/146.4; 340/444
(58) Field of Search ............................... 73/146, 146.4, 73/146.5, 146.2, 146.3; 340/58, 438, 447, 448, 444, 442

(56) References Cited

U.S. PATENT DOCUMENTS 4,311,985 A * 1/1982 Gee et al. ................. 200/61.22
5,109,213 A * 4/1992 Williams .................. 200/61.22

FOREIGN PATENT DOCUMENTS

EP    1197356 A2 * 4/2002 ................. 73/146

OTHER PUBLICATIONS

U.S. Juzswik patent application Ser. No. 09/687,709, filed Oct. 13, 2000 entitled Vehicle–Controlled Tire Condition Sensor Communication Utilizing Fixed Tire Identification.

* cited by examiner

Primary Examiner—Edward Lefkowitz
Assistant Examiner—Alandra Ellington
(74) Attorney, Agent, or Firm—Tarolli, Sundheim, Covell & Tummino L.L.P.

(57) ABSTRACT

A tire inflation pressure monitoring system (10) and a method for monitoring air pressure within a tire (14) are provided. The system (10) includes a tire based unit (18) for sensing air pressure within the tire (14) and for transmitting a pressure signal indicative thereof. The system (10) also includes a vehicle based unit (16) for receiving the pressure signal and for comparing the pressure signal to a predefined pressure range. The vehicle based unit (16) is operable in one of (i) a normal operating mode that outputs an alert signal in response to the air pressure within the tire (14) being outside of the predefined pressure range and (ii) a pressure gauge operating mode that outputs an in-range signal in response to the air pressure within the tire (14) being within the predetermined pressure range.

18 Claims, 4 Drawing Sheets

TIRE PRESSURE MONITORING SYSTEM WITH PRESSURE GAUGE OPERATING MODE FOR INDICATING WHEN AIR PRESSURE WITHIN A TIRE IS WITHIN A PREDETERMINED PRESSURE RANGE

TECHNICAL FIELD

The present invention relates to a tire pressure monitoring system and a method for monitoring air pressure within a pneumatic tire of a vehicle. More particularly, the present invention relates to a tire pressure monitoring system that includes a tire pressure gauge for use in adjusting the air pressure within a tire and a method of using the system.

BACKGROUND OF THE INVENTION

Tire condition monitoring systems, and more particularly tire pressure monitoring systems, are becoming increasingly more popular. Such monitoring systems alert a vehicle operator when a tire condition falls outside of a predetermined range. For example, when monitoring a tire pressure with a tire pressure monitoring system and where the desired tire pressure range is 32–38 psi, the system will alert the driver of a low air pressure condition in response to the air pressure within the tire dropping below 32 psi.

Tire condition monitoring systems assist vehicle operators in maintaining proper inflation pressure within their vehicle tires. Proper inflation pressure results in reduced tire wear, increased vehicle fuel efficiency, and many other positive attributes. Additionally, many vehicle suspension systems are designed for use with tires meeting particular specifications. One of the tire specifications is the tire inflation pressure. Thus, proper inflation pressure may result in a more comfortable and sometimes a safer vehicle ride.

Known tire condition monitoring systems include a tire based device for sensing a tire condition, such as air pressure within a tire. The device transmits signals indicative of either the actual air pressure within the tire or an alert condition when the air pressure within the tire is outside of the predetermined range. A vehicle based controller receives the transmitted signals. A display or other indicator is operatively connected to the vehicle based controller for alerting the vehicle operator when an alert condition arises.

Copending patent application Ser. No. 09/687,709, filed Oct. 12, 2000 and assigned to the assignee of the present invention discloses a tire condition monitoring systems having an associated antenna wired into each wheel well of the vehicle. Each antenna is operable to send a low frequency signal to an associated tire based device to initiate tire condition monitoring. The tire based device responds to the low frequency signal with a radio frequency signal indicating a sensed tire condition and a tire identification code. The location of each tire on the vehicle is determined by matching the known location of the antenna sending the low frequency signal with the identification code from the tire based device responding to the low frequency signal.

When a tire condition monitoring system indicates an alert condition, such as a low pressure condition, the vehicle operator should take appropriate remedial actions, such as adding air to the appropriate tire to bring the pressure within the desired range. Unfortunately, many vehicle operators do not carry air pressure gauges in their vehicles and many air pressure gauges that are supplied at service stations are inaccurate. Thus, a need exists for an accurate and reliable air pressure measuring system and method for indicating that the air pressure within the tire has come within the desired pressure range during the filling process by the vehicle operator or service technician.

SUMMARY OF THE INVENTION

The present invention relates to a tire inflation pressure monitoring system for monitoring air pressure within a tire. The tire pressure monitoring system comprises a tire based unit for sensing air pressure within the tire and for transmitting a pressure signal indicative thereof. The system also comprises a vehicle based unit for receiving the pressure signal and for comparing the pressure signal to a predefined pressure range. The vehicle based unit is operable in one of (i) a normal operating mode and (ii) a pressure gauge operating mode. The vehicle based unit when operating in the normal operating mode outputs an alert signal in response to the air pressure within the tire being outside of the predefined pressure range. The vehicle based unit when operating in the pressure gauge operating mode outputs an in-range signal in response to the air pressure within the tire being within the predetermined pressure range. The system also comprises a switch and at least one indicator. The switch, when actuated, changes the operating mode of the vehicle based unit. The at least one indicator is operatively connected to the vehicle based unit and becomes energized in response to receipt of the alert signal when the vehicle based unit is in the normal operating mode and becomes energized in response to the in-range signal when the vehicle based unit is in the pressure gauge operating mode.

In another aspect, the present invention relates to a method of monitoring air pressure in a pneumatic tire. During the method, an operating mode for a vehicle based unit of a tire pressure monitoring system is ascertained. The vehicle based unit has a normal operating mode and a pressure gauge operating mode. The air pressure within the tire is sensed with a tire based unit and the tire based unit provides a pressure signal indicative of the pressure within the tire to the vehicle based unit. The pressure signal is compared to a predetermined pressure range. An alert signal is output to an indicator in response to the vehicle based unit being in the normal operating mode and the air pressure being outside the predetermined pressure range. An in-range signal is output to the indicator in response to the vehicle based unit being in the pressure gauge operating mode and the pressure signal being within the predetermined pressure range.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
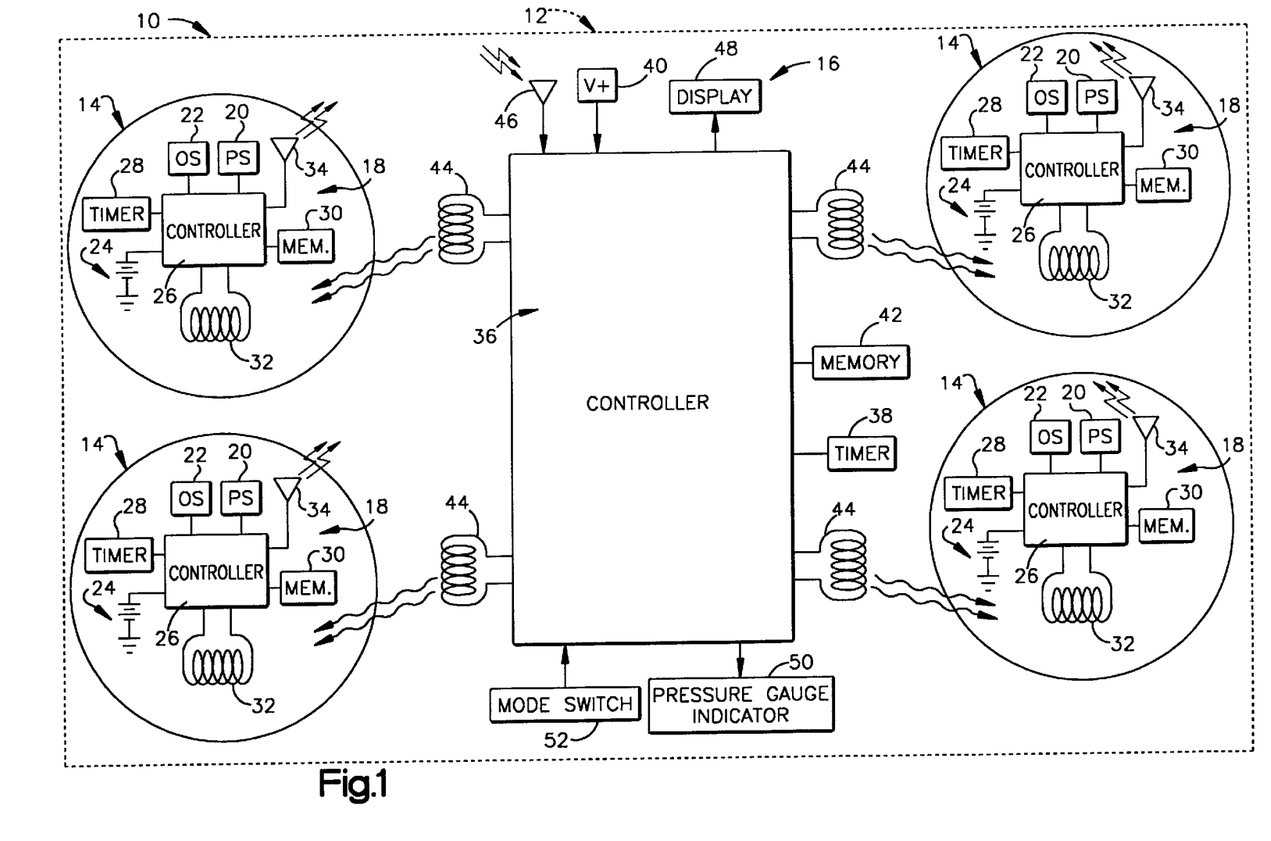
FIG. 1 is a schematic illustration of a tire pressure monitoring system in accordance with the present invention.

FIG. 1 illustrates an exemplary embodiment of a tire pressure monitoring system 10 constructed in accordance with the present invention. The tire pressure monitoring system 10 monitors air pressure within the tires 14 of a vehicle 12. By way of example, FIG. 1 schematically illustrates a vehicle 12 having four tires 14. The vehicle 12 may have a number of tires 14 other than four. The pressure in at least one of the tires 14 is monitored in accordance with the present invention.

The tire pressure monitoring system 10 includes a vehicle based unit 16 and at least one tire based unit 18. The tire pressure monitoring system 10 of FIG. 1 includes four tire based units 18, each tire 14 having an associated tire based unit. The tire based unit 18 of each tire 14 of FIG. 1 is of the same general construction. Therefore, the following description will discuss one tire based unit 18 within one tire 14 and the same reference numbers will be used to identify the corresponding structure of each additional tire based unit. It should be understood that each tire based unit 18 operates in the same manner.

The tire based unit 18 includes a pressure sensor 20 for sensing air pressure within the tire 14. The pressure sensor 20 may be any type of known pressure sensor that measures a fluid pressure and provides a pressure signal indicative thereof.

The tire based unit 18 also includes other sensors 22. The other sensors 22 monitor other conditions of the vehicle tire 14 or of the tire base unit 18, itself. For example, the other sensors 22 may sense the temperature of the tire 14. As additional examples, the other sensors 22 may sense the available voltage of a power supply 24 or other operating parameters of the tire based unit 18. The other sensors 22 output condition signals representative of the associated conditions sensed.

The pressure sensor 20 and the other sensors 22 are operatively connected to a controller 26. The functions of the controller 26 could be performed using one or more digital and/or analog circuits, or an application specific integrated circuit. The controller 26 includes receiver circuitry (not shown) and transmitter circuitry (not shown) connected with a microcontroller (not shown). A timer 28 may be operatively connected to the controller 26 or alternatively, may be included as part of the controller.

A memory 30 is operatively connected to the controller 26 or alternatively, may form a part of the controller 26. The memory 30 includes an identification code for the tire based unit 18. The identification code is generally unique for each tire based unit 18.

The tire based unit 18 also includes a power supply 24 for providing electrical energy to the various components of the tire based unit. The power supply 24 is preferably a battery.

The tire base unit 18 also includes two antennas 32 and 34. Antenna 32 receives signals from the vehicle based unit 16. In the embodiment illustrated in FIG. 1, the receiving antenna 32 for each tire based unit 18 is a magnetic field induction coil that is operatively connected to the controller 26. Although other antenna designs may be utilized for the receiving antenna 32, preferably, the receiving antenna is adapted to receive low frequency ("LF") signals and transfer the received signals to the controller 26.

Antenna 34 for tire based unit 18 is also operatively connected to the controller 26. The transmitting antenna 34 receives a response signal including a message packet from the controller 26 and transmits the response signal as a radio frequency ("RF") signal to the vehicle based unit 16.

The vehicle based unit 16 includes a controller 36. The controller 36 preferably includes a microcontroller. The functions of the controller 36 could be performed using one or more digital and/or analog circuits, or an application specific integrated circuit. The controller 36 also includes receiver circuitry (not shown) and transmitter circuitry (not shown). A timer 38 may be operatively connected to the controller 36 or alternatively, may form a portion of the controller.

The controller 36 is mounted on the body of the vehicle 12. The controller 36 receives electrical energy from a power supply 40, preferably the vehicle battery through appropriate regulating circuitry.

A memory 42 is operatively connected to the controller 36 or alternatively, may form a part of the controller 36. The memory 42 stores information for associating the location of the tire based units 18 to locations of the vehicle 12. Additionally, the memory 42 stores further identification information for use in determining whether a response signal received by the controller 36 originated at a tire based unit 18 associated with the vehicle 12.

A plurality of LF transmitting antennas 44 and a single RF receiving antenna 46 are operatively connected to the controller 36 of the vehicle based unit 16. The vehicle based unit 16 includes one transmitting antenna 44 for each tire based unit 18 to be monitored. Thus, FIG. 1 illustrates four transmitting antennas 44. Each transmitting antenna 44 is located at a position near its associated tire 14 of the vehicle 12. Preferably, each transmitting antenna 44 is mounted in an associated wheel well of the vehicle 12. In the embodiment of FIG. 1, the transmitting antennas 44 are magnetic field induction coils.

The receiving antenna 46 of the vehicle based unit 16 is mounted at the controller 36 location and receives the RF response signals that are transmitted from the transmitting antenna 34 of the tire based units 18. The receiving antenna 46 transfers the received RF response signals to the controller 36.

First and second indicators 48 and 50, respectively, are also operatively connected to the controller 36 of the vehicle based unit 16. The first indicator 48 in FIG. 1 is a visual/audio display. The first indicator 48 is preferably mounted on or near the instrument panel (not shown) of the vehicle and is perceivable from within the vehicle by the vehicle occupant. The first indicator 48 may illustrate to an operator of the vehicle the tire conditions sensed by the respective tire based units 18. The visual indication portion of display 48 displays information for the operator and the audio indication portion produces an audible noise. The display 48 alerts the operator of an alert condition such as abnormally low tire pressure and displays the associated tire having the abnormal condition.

The second indicator 50 is perceivable from outside the vehicle 12 at a location adjacent any one of the tires 14 having a tire based unit 18. Preferably, the second indicator 50 is an audio indicator for producing an audible noise. By way of example, the second indicator 50 may be the vehicle horn. Alternatively, the second indicator 50 may be a visual indicator such as a light source.

As an alternative to first and second indicators 48 and 50, a single indicator (not shown) that may be perceived from both within the vehicle 12 and outside the vehicle may be used. For example, one or more lights (not shown) that are mounted to the bottom of the rear view mirror (not shown) may be used instead of separate first and second indicators 48 and 50.

In the embodiment illustrated in FIG. 1, a mode switch 52 that is accessible to the vehicle operator is operatively connected to the controller 36 of the vehicle based unit 16.

When actuated, the mode switch 52 sends a signal to the controller 36 instructing the controller to switch operating modes, as will be discussed below.

The vehicle based unit 16 of the present invention operates in one of two operating modes, a normal operating mode and a pressure gauge operating mode. In the normal operating mode, the controller 36 of the vehicle based unit 16 systematically outputs initiation signals to the transmitting antennas 44 and then monitors for an RF response signal from the tire based units 18. Specifically, the controller 36 of the vehicle based unit 16 sends an LF initiation signal to one of the transmitting antennas 44. The controller 36 then monitors for the RF response signal from the tire based unit 18 associated with the respective transmitting antenna 44.

The RF response signal includes a message packet having an identification code portion associated with that tire based unit 18, a pressure signal code portion indicative of the sensed air pressure within the tire 14, and may include another condition signal code portion indicative of other sensed tire conditions.

Upon receipt of the RF response signal, the controller 36 of the vehicle based unit 16 compares the identification code portion with codes stored in memory 42 to verify that the message packet received is from the initiated tire based unit 18. After verification of the identification code portion, pressure and other condition information are displayed. This process repeats for all vehicle tires 14 having tire based units 18.

Preferably, each LF initiation signal is provided in the form of a magnetic field or magnetic induction signal. In one example, the LF initiation signal is approximately 125 kHz.

The signal strength of the low frequency initiation signals falls off rapidly as a function of the distance from the transmitting antennas 44. The initiation signals are output at a strength to be received only by an associated tire based unit 18 of a tire 14 located adjacent a transmitting antenna 44.

It is to be noted that in a preferred example of the normal operating mode, the communication from the vehicle based unit 16 to a respective tire based unit 18 via the LF initiation signal is a stimulus only and does not convey information. However, the controller 36 "knows" which transmitting antenna 44 is associated with which tire based unit 18 so that the vehicle based unit 16 can establish communication with a particular tire based unit.

In another embodiment, LF initiation signals are only used in a learn mode to match locations of the vehicle to identification code portions of RF response signals. In this embodiment, in the normal operating mode, the controller 26 of the tire based unit 18 senses air pressure within the tire 14 at a first time interval and transmits an RF response signal at a second time interval or upon the occurrence of an alert condition.

When operating in the normal operating mode, i.e., mode switch 52 is placed in a normal operating position, the controller 36 of the vehicle based unit 16, after verifying that the message packet was received from the initiated tire based unit 18, compares the monitored pressure value received to a predefined pressure range. If the controller 36 determines that the pressure value is outside of the predefined pressure range, the controller 36 outputs an alert signal to the first indicator 48. The first indicator 48 then alerts the vehicle operator of the alert condition and, as a result of knowing the tire based unit identification code associated with a particular transmitting antenna 44, indicates the location of the tire having the alert condition.

When actuated into the pressure gauge mode via mode switch 52, the vehicle based unit 16 transmits mode switch signals via the transmitting antennas 44 to all of the tire based units 18 associated with the vehicle based unit. The mode switch signal is a signal that is different than the LF initiation signal and indicates to each tire based unit 18 that the vehicle based unit 16 is in the pressure gauge mode. The mode switch signal may include a command or bit stream that is transmitted via transmitting antennas 44, may include an LF signal transmitted at a frequency that is different than the LF initiation signal, or may include other forms that distinguish the mode switch signal from an initiation signal.

Once in the pressure gauge mode, the vehicle based unit 16 monitors for a response signal from any one of the associated tire based units 18. It is assumed that the air pressure within only one tire 14 is adjusted at a time. Upon receiving an RF response signal from one of the associated tire based units 18, the vehicle based unit 16, after confirming the identification code portion of the signal, compares the pressure value indicated by the pressure signal portion of the RF response signal with the predefined pressure range. If the air pressure is within the predefined pressure range, the controller 36 of the vehicle based unit 16 outputs an in-range signal to the second indicator 50. In response to the in-range signal, the second indicator 50 outputs a signal that can be perceived by the vehicle operator at a location adjacent an associated tire 14. For example, in response to the in-range signal, the second indicator 50 may output a signal of three short beeps of the vehicle horn (not shown).

In one embodiment of the present invention, the vehicle based unit 16, when operating in the pressure gauge mode, outputs an increment signal to the second indicator 50 upon each incremental change in pressure within an associated tire 14. For example, when the pressure value indicates a one psi pressure change in an associated tire 14, the increment signal is output to the second indicator 50. In response to the increment signal, the second indicator 50 outputs a signal that is different than the signal output in response to the in-range signal. For example, in response to the increment signal, the second indicator 50 may output a signal of one short beeps of the vehicle horn (not shown).

Figure 2:
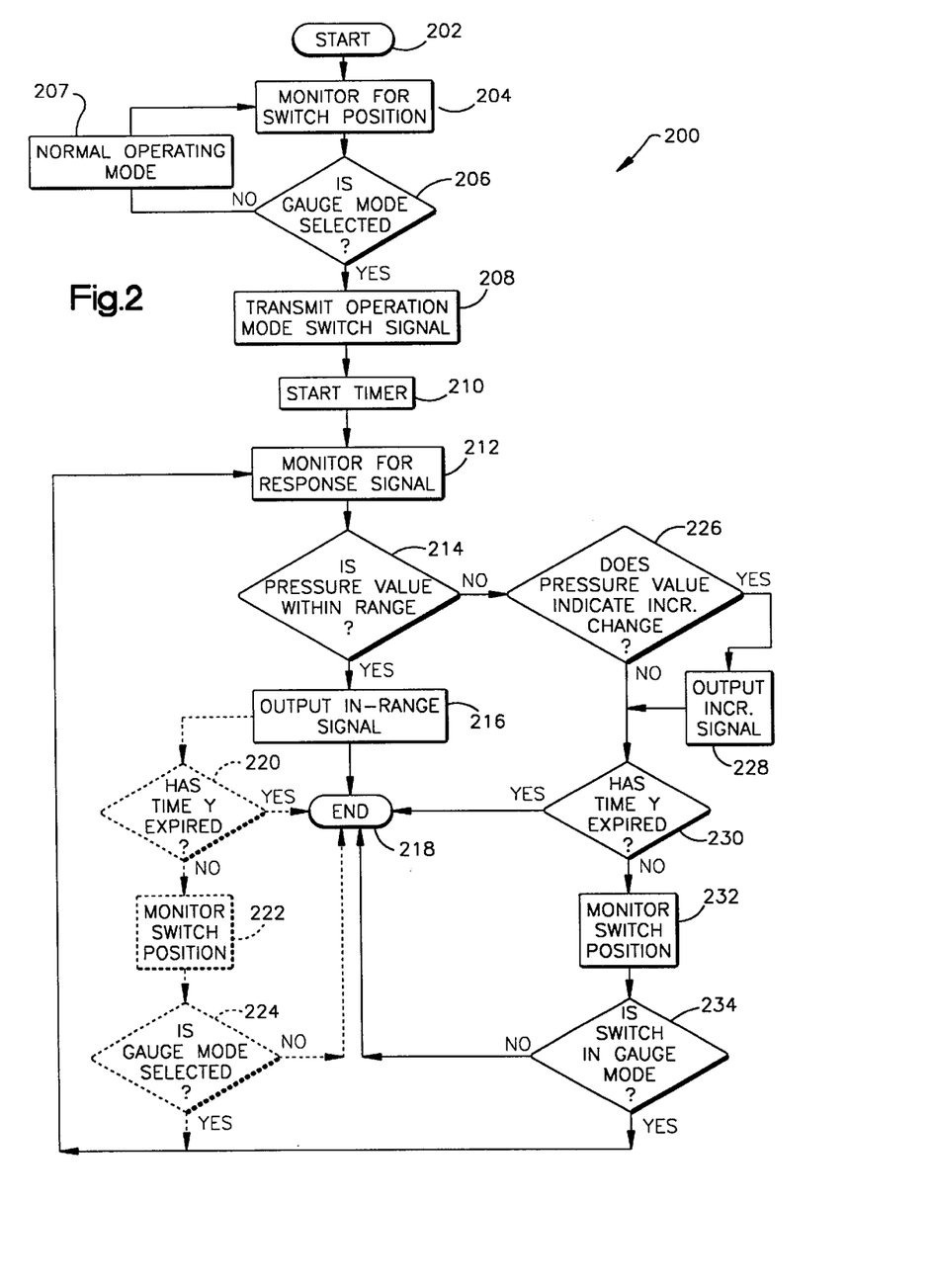
FIG. 2 is a flow diagram illustrating a control process of the vehicle based unit of the tire pressure monitoring system of FIG. 1.

The flow diagram of FIG. 2 illustrates a control process 200 of the vehicle based unit 16. The process 200 starts at step 202 where the counters are reset, memories are cleared, timers are reset, initial flag conditions are set, etc. The process 200 then proceeds to step 204. At step 204, the mode switch 52 position is monitored. The process 200 then proceeds to step 206. At step 206, the vehicle based unit 16 determines whether the mode switch 52 is in the pressure gauge mode position, i.e. whether the operator of the vehicle toggle mode switch 52 into a position for operating in the pressure gauge mode. If the determination at step 206 is negative, the process 200 proceeds to step 207 where the normal operating mode for the controller 36 of the vehicle based unit 16 is resumed. The process 200 then loops back to step 204.

The process 200 being in a loop of steps 204, 206, and 207 means that the vehicle based unit 16 is operating in the normal operating mode. Other process steps of the normal operating mode are not shown. As described above, in the normal operating mode, controller 36 periodically transmits LF initiation signals, monitors for RF response signals, and displays tire conditions.

The process 200 proceeds from an affirmative determination at step 206 to step 208. At step 208, the vehicle based unit 16 transmits mode switch signals via LF transmitting antennas 44 to all of the tire based units 18 associated with the vehicle based unit. The process 200 then proceeds to step 210. At step 210, the timer 38 of the vehicle based unit 16 is started. The process 200 then proceeds to step 212.

At step 212, the vehicle based unit 16 monitors for an RF response signal from any one of its associated tire based units 18. In response to receipt of an RF response signal and verification, by identification code comparison, that the response signal originated one of its associated tire based units 18, the process 200 proceeds to step 214. At step 214, a determination is made as to whether the pressure value indicated by the signal portion of the message packet of the response signal is within the tire is within the predefined pressure range. If the determination at step 214 is affirmative, the process 200 proceeds to step 216. At step 216, the controller 36 outputs the in-range signal to the second indicator 50 and the second indicator responds with an appropriate perceivable signal. The process 200 then proceeds to step 218 and the pressure gauge mode control process ends. At step 218, the controller 36 switches to the normal operating mode.

Alternatively, as shown by dashed lines in FIG. 2, the process 200 may proceed from step 216 to step 220. At step 220, a determination is made as to whether a predetermined time, indicated at Y, has expired since the timer 38 was started. If time Y has expired and thus, the determination at step 220 is affirmative, the process 200 proceeds to step 218 and the pressure gauge mode control process ends. When the pressure gauge mode control process ends, the mode switch 52 is automatically reset into a normal operation mode position.

If the determination at step 220 is negative, the process 200 proceeds to step 222 and the mode switch 52 position is again monitored. The process 200 then proceeds to step 224. At step 224, a determination is made as the whether the mode switch 52 is in the pressure gauge mode position. If the determination in step 224 is affirmative, the process 200 returns to step 212. If the determination in step 224 is negative and the mode switch is in the normal operating mode position, the process 200 proceeds to step 218 and the pressure gauge mode control process ends. These alternative steps allow the air pressure within multiple tires 14 to be adjusted without the need to actuate the mode switch 52 between tires.

Referring again to step 214, if the determination is negative, the process 200 proceeds to step 226. At step 226, a determination is made as to whether the pressure value indicated by the pressure signal portion of the RF response signal indicates an incremental pressure change, for example one psi. If the determination at step 226 is affirmative, the process 200 proceeds to step 228. At step 228, the controller 36 of the vehicle based unit 16 outputs an increment signal to the second indicator 50 and the second indicator outputs the appropriate perceivable signal. The process 200 then proceeds to step 230.

If the determination at step 226 is negative, the process 200 proceeds to step 230. At step 230, a determination is made as to whether the predetermined time Y has expired since the timer 38 was started. If the determination at step 230 is affirmative, the process 200 proceeds to step 218 and the pressure gauge mode control process ends. If the determination at step 230 is negative, the process 200 proceeds to step 232.

At step 232, the mode switch 52 position is monitored. The process 200 then proceeds to step 234. At step 234, a determination is made as the whether the mode switch 52 is in the pressure gauge mode position. If the determination in step 234 is affirmative, the process 200 returns to step 212.

If the determination in step 234 is negative, the process 200 proceeds to step 218 and the pressure gauge mode control process ends.

The tire based unit 18 also operates in one of two modes of operation, a normal operating mode and a pressure gauge mode. In the normal operating mode, the tire based unit 18 remains asleep until receiving an LF initiation signal from the vehicle based unit 16. In response to the LF initiation signal, the tire based unit 18 "wakes-up" and senses the air pressure within the tire 14 and any other tire condition to be sensed. The controller 26 of the tire based unit 18 then assembles the message packet including an identification code portion, the pressure signal portion, and condition signal portion if other tire conditions are being sensed. The controller 26 outputs an RF response signal, including the message packet, via its transmitting antenna 34.

The tire based unit 18 defaults to the normal operating mode. When operating in the normal operating mode, each tire based unit 18 switches to the pressure gauge mode in response to receipt of a mode switch signal sent from transmitting antenna 44.

When operating in the pressure gauge mode, the tire based unit 18 monitors the air pressure within the tire 14 at an increased rate, as compared to when operating in the normal operating mode. Preferably, when the tire based unit 18 is operated in the pressure gauge operating mode, the air pressure within the tire 14 is monitored at least twice per second. The monitored air pressure is input into the controller 26 of the tire based unit 18. The controller 26 of the tire based unit 18 determines when the pressure within the tire 14 has changed by a predetermined incremental amount. When the air pressure has changed by the predetermined incremental amount, the controller 26 of the tire based unit 18 assembles a message packet that includes an identification code portion and a pressure signal portion. The controller 26 outputs an RF response signal including the message packet via transmitting antenna 34.

Figure 3:
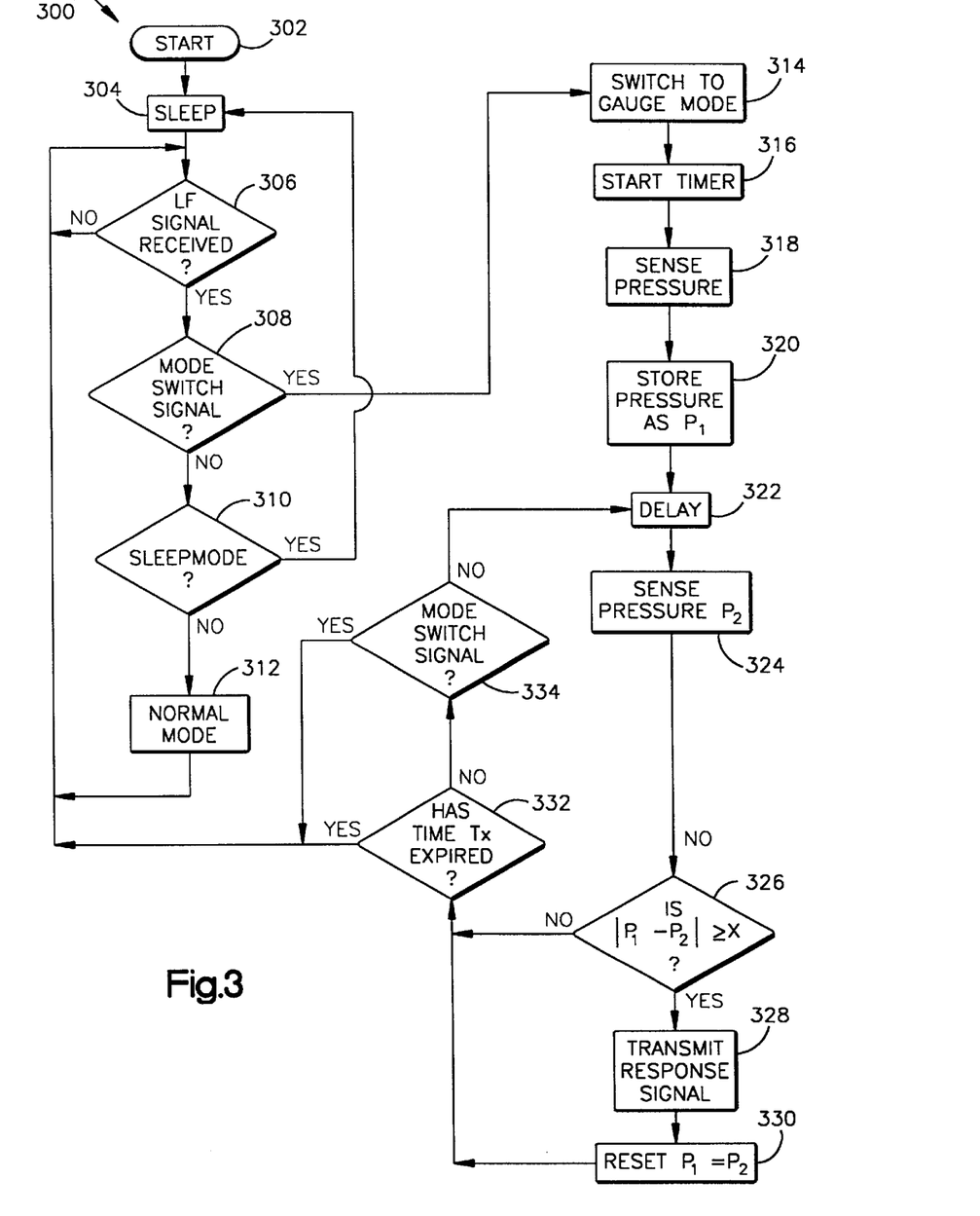
FIG. 3 is a flow diagram illustrating a control process of the tire based unit of the tire pressure monitoring system of FIG. 1.

FIG. 3 illustrates a control process 300 of the tire based unit 18. The process 300 begins at step 302 where the counters are reset, memories are cleared, timers are reset, initial flag conditions are set, etc. The process 300 then proceeds to step 304. At step 304, the tire based unit 18 is operating in the normal operating mode and is asleep. The process 300 proceeds from step 304 to step 306. At step 306, a determination is made as to whether a low frequency signal was received. If the determination at step 306 is negative, the controller 26 of the tire based unit 18 remains asleep. If the determination at step 306 is affirmative, the controller 26 of the tire based unit 18 awakens and the process 300 proceeds to step 308.

At step 308, a determination is made as to whether the received low frequency signal is the mode switch signal. If the determination at step 308 is negative, it is assumed that the received LF signal was the initiation signal and the process 300 proceeds to step 310. At step 310, a determination is made as to whether the sleep mode should be reentered. If the LF signal from step 306 is the initiation signal, the determination at step 310 is negative and the process 300 proceeds to step 312. If the LF signal is not the initiation signal, the determination at step 310 is affirmative and the process 300 returns to step 304.

At step 312, the process 300 enters the normal mode and the tire conditions, including the air pressure within the tire 14, are sensed, the message packet is assembled, and an RF response signal is transmitted. The process 300 then returns to step 306.

Referring again to step 308, if the determination is affirmative, the process 300 proceeds to step 314. At step 314, the tire based unit 18, in response to the mode switch signal, switches into the pressure gauge mode. The process 300 then proceeds to step 316. At step 316, the timer 28 of the tire based unit 18 is started. The process 300 then proceeds to step 318 in which the air pressure within the tire 14 is sensed. The process 300 then proceeds to step 320.

At step 320, the air pressure is stored as $P_1$. The process 300 then proceeds to step 322 and delays for a short time period, which may be determined with reference to timer 28. In one embodiment, the time period of the delay is approximately one-half of a second. The process 300 then proceeds to step 324 and the air pressure within the tire 14, indicated as $P_2$, is again sensed. The process 300 then proceeds to step 326.

At step 326, a determination is made as to whether the absolute value of the difference between pressure $P_2$ and pressure $P_1$ is greater that a predetermined incremental amount, shown at X. If the determination in step 326 is affirmative, the process 300 proceeds to step 328. At step 328, the message packet including the pressure signal is assembled and an RF response signal is transmitted. The process 300 then proceeds to step 330 in which pressure $P_1$ is reset to equal pressure $P_2$. The process 300 then proceeds to step 332.

If the determination at step 326 is negative, the process 200 proceeds from step 326 to step 332. At step 332, a determination is made as to whether a predetermined time, indicated as $T_x$, has expired on the timer 28. If time $T_x$ has expired and thus, the determination at step 332 is affirmative, the process 300 returns to step 304. If the determination at step 332 is negative, the process 300 proceeds to step 334. At step 334, a determination is made as to whether another mode switch signal, switching the tire based unit 18 back into the normal operating mode, has been received. If the determination at step 334 is negative, the process 300 returns to step 322. If the determination at step 334 is affirmative, the process 300 returns to step 304.

The processes 200 and 300 illustrated by the flow diagrams of FIGS. 2 and 3 are for example only and are not meant to limit the present invention. Alternative processes within the scope of the present invention are also contemplated.

Figure 4:
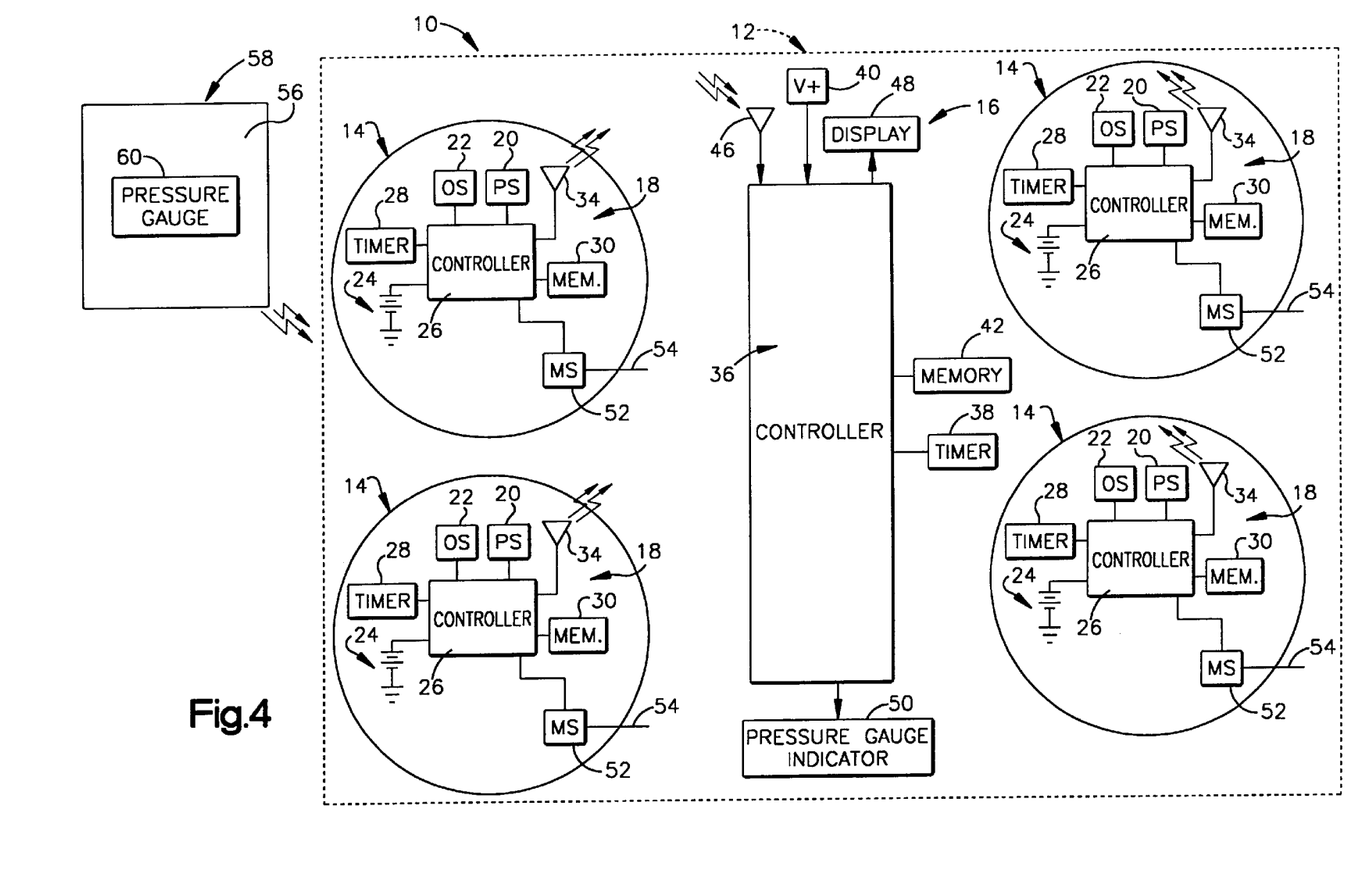
FIG. 4 is a schematic illustration a second embodiment of the tire pressure monitoring system in accordance with the present invention.

FIG. 4 illustrates schematically a second exemplary embodiment of the tire pressure monitoring system 10 of the present invention. Structures illustrated in FIG. 4 that are similar to or the same as structures in FIG. 1 are indicated by the same reference numerals.

As shown in FIG. 4, a mode switch 52 is operatively connected to each tire based unit 18 and no mode switch is operatively connected to the vehicle based unit 16. In the embodiment of FIG. 4, the controller 26 for each tire based unit 18 receives a mode switch signal when the mode switch 52 associated with that tire based unit is actuated. In response to receiving the mode switch signal, the controller 26 assembles a signal, including a message packet indicating a mode of operation for the vehicle based unit 16 to enter. The controller 26 then outputs the signal via its transmitting antenna 34. Upon receiving the signal, the vehicle based unit 18 begins to operate in the mode indicated by the message packet.

The tire based unit 18 and the vehicle based unit 16 of FIG. 4 default to the normal operating mode. When switched to the pressure gauge mode, the timers 28 and 38 in both the tire based unit 18 and the vehicle based unit are started. If the tire based unit 18 and the vehicle based unit 16 are not switched back to the normal operating mode in a predetermined time period, each will automatically switch back to the normal operating mode.

In the embodiment of FIG. 4, the mode switch 52 for each tire 14 may be actuated manually, for example, by depression of the valve stem, indicated schematically at 54. Alternatively, the mode switch 52 for each tire 14 may be actuated by holding a mode switch transmitter 56, shown as part of a keyless entry fob 58 in FIG. 4, near the appropriate tire 14 and actuating a switch 60 on the transmitter to provide a short range signal that electronically actuates the mode switch 52 of the tire based unit 18 adjacent the transmitter. As a further alternative, the mode switch 52 for a tire 14 may be actuated automatically in response to discontinued rotation of the tire for a predetermined time period. Discontinued rotation of the tire 14 may be determined by implementing a centrifugal switch (not shown) into the tire based unit 18 of the tire.

From the above description of the invention, those skilled in the art will perceive improvements, changes and modifications. For example, the mode switch may be automatically actuated into the normal operation mode when the vehicle is placed in gear or when the vehicle ignition is started. Such improvements, changes and modifications within the skill of the art are intended to be covered by the appended claims.

Having described the invention, we claim the following:

1. A method of monitoring air pressure in a pneumatic tire, the method comprising the steps of:

ascertaining an operating mode for a vehicle based unit of a tire pressure monitoring system, the vehicle based unit having a normal operating mode and a pressure gauge operating mode;

sensing air pressure within the tire with a tire based unit and providing a pressure signal indicative of the pressure within the tire to the vehicle based unit;

comparing the pressure signal to a predetermined pressure range;

outputting an alert signal to an indicator in response to the vehicle based unit being in the normal operating mode and the air pressure being outside the predetermined pressure range; and outputting an in-range signal to the indicator in response to the vehicle based unit being in the pressure gauge operating mode and the pressure signal being within the predetermined pressure range.

2. The method of claim 1 further including the steps of actuating a switch to change the operating mode of the vehicle based unit, and outputting a switch mode signal from the vehicle based unit to the tire based unit when the operating mode of the vehicle based unit is changed.

3. The method of claim 2 further including the step of changing an operating mode of the tire based unit in response to the switch mode signal, the tire based unit having a normal operating mode and a pressure gauge operating mode.

4. The method of claim 3 further including the step of sensing pressure at an increased rate when the tire based unit is in the pressure gauge operating mode.

5. The method of claim 1 further including the step of providing an audible noise with the indicator in response to receipt of one of the alert signal and the in-range signal.

6. The method of claim 1 further including the steps of outputting an increment signal from the vehicle based unit to the indicator in response to a change in pressure within the tire of a predetermined value, providing a single audible noise from the indicator in response to receipt of the increment signal, and providing a series of audible noises from the indicator in response to receipt of the in-range signal.

7. A tire inflation pressure monitoring system for monitoring air pressure within a tire, the tire pressure monitoring system comprising:

a tire based unit for sensing air pressure within the tire and for transmitting a pressure signal indicative thereof;

a vehicle based unit for receiving the pressure signal and for comparing the pressure signal to a predefined pressure range, the vehicle based unit being operable in one of (i) a normal operating mode and (ii) a pressure gauge operating mode, the vehicle based unit when operating in the normal operating mode outputting an alert signal in response to the air pressure within the tire being outside of the predefined pressure range, the vehicle based unit when operating in the pressure gauge operating mode outputting an in-range signal in response to the air pressure within the tire being within the predetermined pressure range;

a switch for, when actuated, changing the operating mode of the vehicle based unit; and at least one indicator being operatively connected to the vehicle based unit and becoming energized in response to receipt of the alert signal when the vehicle based unit is in the normal operating mode and becoming energized in response to the in-range signal when the vehicle based unit is in the pressure gauge operating mode.

8. The tire inflation pressure monitoring system of claim 7 wherein the at least one indicator includes first and second indicators, the first indicator becoming energized in response to receipt of the alert signal when the vehicle based unit is in the normal operating mode and the second indicator becoming energized in response to the in-range signal when the vehicle based unit is in the pressure gauge operating mode.

9. The tire inflation pressure monitoring system of claim 7 wherein the tire based unit is also operable in one of a normal operating mode and a pressure gauge operating mode, the tire based unit sensing air pressure within the tire at a faster rate when operating in the pressure gauge operating mode than when operating in the normal operating mode.

10. The tire inflation pressure monitoring system of claim 7 wherein the switch is operatively connected to the vehicle based unit.

11. The tire inflation pressure monitoring system of claim 10 wherein the vehicle based unit includes a transmitting antenna for transmitting an operating mode switch signal, the tire based unit including a receiving antenna for receiving the operating mode switch signal, the tire based unit switching operating modes in response to receipt of the operating mode switch signal.

12. The tire inflation pressure monitoring system of claim 1 wherein the at least one indicator includes a means for providing an audible noise in response to the at least one indicator becoming energized.

13. The tire inflation pressure monitoring system of claim 1 wherein the at least one indicator includes means for providing a series of audible noises in response to the at least one indicator receiving the in-range signal, each audible noise of the series of audible noises being spaced in time from other audible noises of the series of audible noises.

14. The tire inflation pressure monitoring system of claim 13 wherein the vehicle based unit, when operating in the pressure gauge mode, outputs a increment signal in response to each change in pressure within the tire of a predetermined value, the at least one indicator becoming energized so as to provide a single audible noise in response to receipt of the increment signal.

15. The tire inflation pressure monitoring system of claim 7 wherein the switch is operatively connected to the tire based unit.

16. The tire inflation pressure monitoring system of claim 15 wherein the tire based unit includes a transmitting antenna for transmitting a signal indicating an operating mode for the vehicle based unit to enter.

17. The tire inflation pressure monitoring system of claim 15 wherein the switch is actuated in response to depression of a valve stem associated with the tire.

18. The tire inflation pressure monitoring system of claim 15 wherein the switch is actuated in response to actuation of a portable transmitter placed adjacent the tire.

* * * * *

UNITED STATES PATENT AND TRADEMARK OFFICE
CERTIFICATE OF CORRECTION

PATENT NO. : 6,612,165 B2
DATED : September 2, 2003
INVENTOR(S) : David Leonard Juzswik, Daniel J. Wyman and Thomas John LeMense It is certified that error appears in the above-identified patent and that said Letters Patent is hereby corrected as shown below:

Column 12,
Lines 13 and 17, before "wherein" change "1" to -- 7 --.

Signed and Sealed this

Twenty-sixth Day of July, 2005

JON W. DUDAS
*Director of the United States Patent and Trademark Office*